United States Patent [19]

Kotter et al.

[11] Patent Number: 4,996,531
[45] Date of Patent: Feb. 26, 1991

[54] DIGITAL OPTICAL CONVERSION MODULE

[75] Inventors: Dale K. Kotter, North Shelley; Richard A. Rankin, Ammon, both of Id.

[73] Assignee: The United States of America as represented by the United States Department of Energy, Washington, D.C.

[21] Appl. No.: 221,394

[22] Filed: Jul. 19, 1988

[51] Int. Cl.$^5$ .................................................. H03M 1/60
[52] U.S. Cl. ..................................... 341/157; 341/137; 455/608
[58] Field of Search ............... 341/157, 110, 120, 132, 341/137; 455/600, 608, 613, 617

[56] References Cited

U.S. PATENT DOCUMENTS

| | | | |
|---|---|---|---|
| 4,399,563 | 8/1983 | Greenberg | 455/612 X |
| 4,547,729 | 10/1985 | Adolfsson et al. | 324/105 X |
| 4,633,523 | 12/1986 | Witkover | 455/608 |

Primary Examiner—William M. Shoop, Jr.
Assistant Examiner—Brian K. Young
Attorney, Agent, or Firm—Bradley W. Smith; John M. Albrecht; William R. Moser

[57] ABSTRACT

A digital optical conversion module used to convert an analog signal to a computer compatible digital signal including a voltage-to-frequency converter, frequency offset response circuitry, and an electrical-to-optical converter. Also used in conjunction with the digital optical conversion module is an optical link and an interface at the computer for converting the optical signal back to an electrical signal. Suitable for use in hostile environments having high levels of electromagnetic interference, the conversion module retains high resolution of the analog signal while eliminating the potential for errors due to noise and interference. The module can be used to link analog output scientific equipment such as an electrometer used with a mass spectrometer to a computer.

14 Claims, 2 Drawing Sheets

DIGITAL OPTICAL CONVERSION MODULE

CONTRACTUAL ORIGIN OF THE INVENTION

The United States Government has rights in this invention pursuant to Contract No. DE-AC07-84ID12435 between the United States Government and Westinghouse Electric Corporation.

BACKGROUND OF THE INVENTION

It is by now well appreciated that there can be numerous advantages to linking the output of normally analog scientific equipment to a computer system. Such benefits include long-term secure storage, availability for later analysis, the capability of various data analysis techniques, and ease of transferability. In addition, by linking scientific equipment to a computer, control of the equipment can be turned over to the computer. The computer can adjust the scientific equipment far more rapidly than a human operator possibly could. This affords the opportunity for using a computer to trigger experiments, sample readouts, reset the equipment and perform other numerous adjustments of the equipment thereby greatly enhancing use of the equipment over previous manual operation. As a consequence, many scientific experiment devices which traditionally produced analog outputs have been redesigned with digital outputs or have been adapted with an interface to allow connection to a digital computer storage means.

In the last several years, it has become common for scientists to use microcomputers in conjunction with their experiments. The availability and low cost of microcomputers has made them commonplace in the laboratory. Attracted by the advantages of using microcomputers, many scientists have developed basic programming skills, or at least a working understanding of the microcomputer, so that they can use the microcomputer as another piece of laboratory equipment. This, in turn, increases the importance of providing for interfacing scientific equipment with a computer, such as the IBM or Apple microcomputers.

The present invention is directed toward obtaining the above mentioned advantages for an analog parametric electrometer used in conjunction with a mass spectrometer. The Idaho Chemical Processing Plant (ICPP) operated by Westinghouse Electric, Inc. for the U.S. Department of Energy has such equipment in its mass spectrometry laboratory. The adaptation of the electrometer output to the digital computer system presented unique problems to which the novel design of the present invention is directed.

There are various types of mass spectrometers. The type of mass spectrometer used at the ICPP is the thermal-solid type. In this type of mass spectrometer, a sample of solid material is heated to a very high temperature at which the sample emits ions. The ions are accelerated and directed through a magnetic field. The magnetic field bends the trajectories of the moving ions so that the ions separate into bands depending on their weight and charge. A detector is positioned to intercept the trajectories of certain of these bands of ions. The detector includes a cup against which these ions collide. An electrometer is used in conjunction with this type of mass spectrometer. The electrometer measures the ions that impinge on the cup.

Because of the specialized nature of this type of equipment, there are few manufacturers. Consequently, there are limited choices of compatible equipment. The mass spectrometer and electrometer used at the ICPP are made by the National Bureau of Standards (NBS). The electrometer available from NBS which is compatible with the NBS mass spectrometer provided no means of interfacing to a computer system. The available electrometer which is compatible with the mass spectrometer provided output to an analog meter or strip chart. If it was desired to store the data in a computer for analysis or storage, one had to input such data manually from the strip chart. This process was time consuming and could introduce error. In addition, because the output of the electrometer consisted of either a strip chart or analog meter, no means were provided to use the electrometer output to control operation of the mass spectrometer. As described above, there are numerous advantages of operation which can be obtained by using a computer to control the equipment. Such advantages as computer controlled timing, sampling, etc. are clearly applicable to the operation of a mass spectrometer. However, these advantages were unavailable because of the lack of a device which allowed real-time digital output of the mass spectrometer.

Conversion of an analog signal to a digital signal is well known. Numerous such devices are available from many manufacturers. The devices are variously designed and can be adapted to a variety of needs. However, no device existed which could be adapted for the electrometer used in conjunction with the mass spectrometer. There are several reasons for this: (1) the electrometer must operate in an extremely hostile environment, (2) the value of the output signal depends on very high resolution and accuracy, and (3) real time output is necessary to provide a necessary level of computer control. These reasons precluded use of all existing devices which provided analog to digital conversion.

The hostile environment derives from the mass spectrometer. Mass spectrometers contain many sources of potential electromagnetic interference. As described above, the mass spectrometer uses high temperatures to ionize a sample and a magnetic field to accelerate and bend the ion trajectories. This fills the environment around the mass spectrometer with a high level of electromagnetic interference. In addition, there are fields generated by high voltage sources, ground loops, and motor driven cooling systems.

Within this environment, the electrometer must operate. The electrometer is used to make ultra low-level measurements of electrical properties by means of mechanical forces. Because the electrometer is extremely sensitive, it must be guarded from noise and interference. Unfortunately, the output of the electrometer is not as easy to shield. Due to the mechanics of racking the instrumentation, the electrometer signal cable is in close proximity to sources of interference. Even with the use of high quality shielded coaxial cable, there can be introduced a potential source of noise from electromagnetic coupling. In addition, at the higher frequencies of data acquisition, signal distortion and ringing tend to occur due to the capacitance inherent in coaxial cable. This can result in false triggering of the counter and data error.

The second reason why existing converters are unsuitable for use with the mass spectrometer is the requirement for high accuracy. The accuracy of the conversion process depends upon the dynamic range, resolution, and sample speed of the conversion module. The electrometer measures a wide spectrum of signals. Intensity also varies greatly between major and minor isotopic peaks. It is critical in the design of a conversion device to provide for a wide dynamic range. The conversion device must also provide the greatest possible span between the maximum full scale signal level and the lowest detectable signal. This will ensure that data is not lost from falling outside the bandwidth of the instrumentation. The conversion module must also maintain a high data resolution. For correct isotopic analysis even minute changes in signal levels must be detectable so that events do not go undetected.

Another reason why commercially available converters are unsuitable for use with the mass spectrometer is the lack of real time output. Real time output is unnecessary if the only purpose of the digital output is data storage. For data storage purposes, the output can be sent to a buffer or otherwise stored for reconstruction later. However, if the digital output is intended for use with a computer control system for the mass spectrometer, real time output is essential. With real time or near real time output, the input dynamics of the system can be controlled and modified in response to output signal changes. If an appreciable time lag exists for the availability of the output, it will be of little value for input control.

Therefore, it is an object of the present invention to provide an apparatus for linking the analog output of an electrometer to a computer.

It is another object of this invention to provide an interface between an analog instrument system and a digital system under electromagnetic conditions adverse to direct electrical linkage.

It is a further object of this invention to provide the capability of computerizing data acquisition of an analog parametric electrometer to a mass spectrometer computerized data acquisition system.

It is still further object of this invention to provide a high level of noise immunity to the link between an electrometer and a computer data system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention is a digital/optical conversion module (DOCM) which converts an analog signal to a digital signal. The DOCM includes a voltage-to-frequency converter to change the analog signal to a frequency based signal. The frequency based signal is offset to preserve the accuracy. The offset frequency signal is converted to an optical signal for conveyance in an optic link to a computer without the possibility of transmission errors due to electromagnetic interference in a hostile environment. An optical interface at the computer converts the optical signal back to an electrical signal and also converts the signal to computer readable n-bit words.

DETAILED DESCRIPTION OF THE INVENTION

The DOCM is a single module that fits into the electrometer chassis without the modification of any existing circuitry. The present invention is specifically designed for use with a National Bureau of Standards (NBS) parametric electometer although its use can be readily adapted to other analog output instruments in mass spectrometry laboratories or other facilities where similar conditions exist. As mentioned above, this invention is ideally suited for use in a hostile environment. This invention could be used in conjunction with nuclear reactors, in space or in other hostile environments having high electromagnetic interferences.

Figure 1:
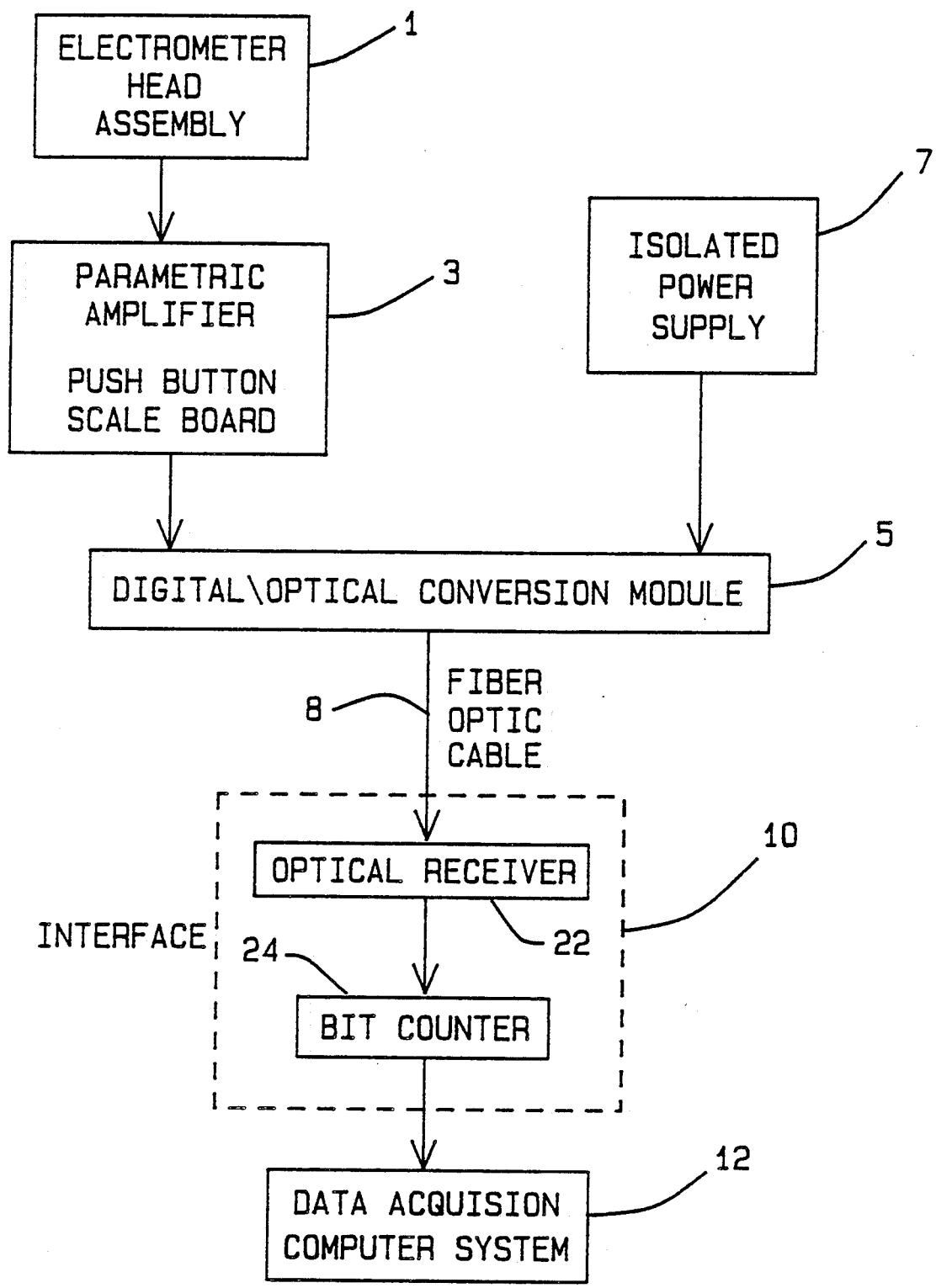
FIG. 1 is a flow chart showing the relationship of the present invention to the other components in the mass spectrometry data acquisition system.

Referring to FIG. 1, there is shown how the present invention integrates into the mass spectrometer data acquisition system. In FIG. 1, an electrometer head assembly 1 provides output to an NBS parametric amplifier 3 which in turn directs its output to the DOCM (Digital Optical Conversion Module) 5. The DOCM 5 has an isolated power supply 7. The DOCM 5 provides output via fiber optic cable 8 to interface 10 which includes an optical receiver and a 24-bit counter. Interface 10 provides output to computer system 12.

Figure 2:
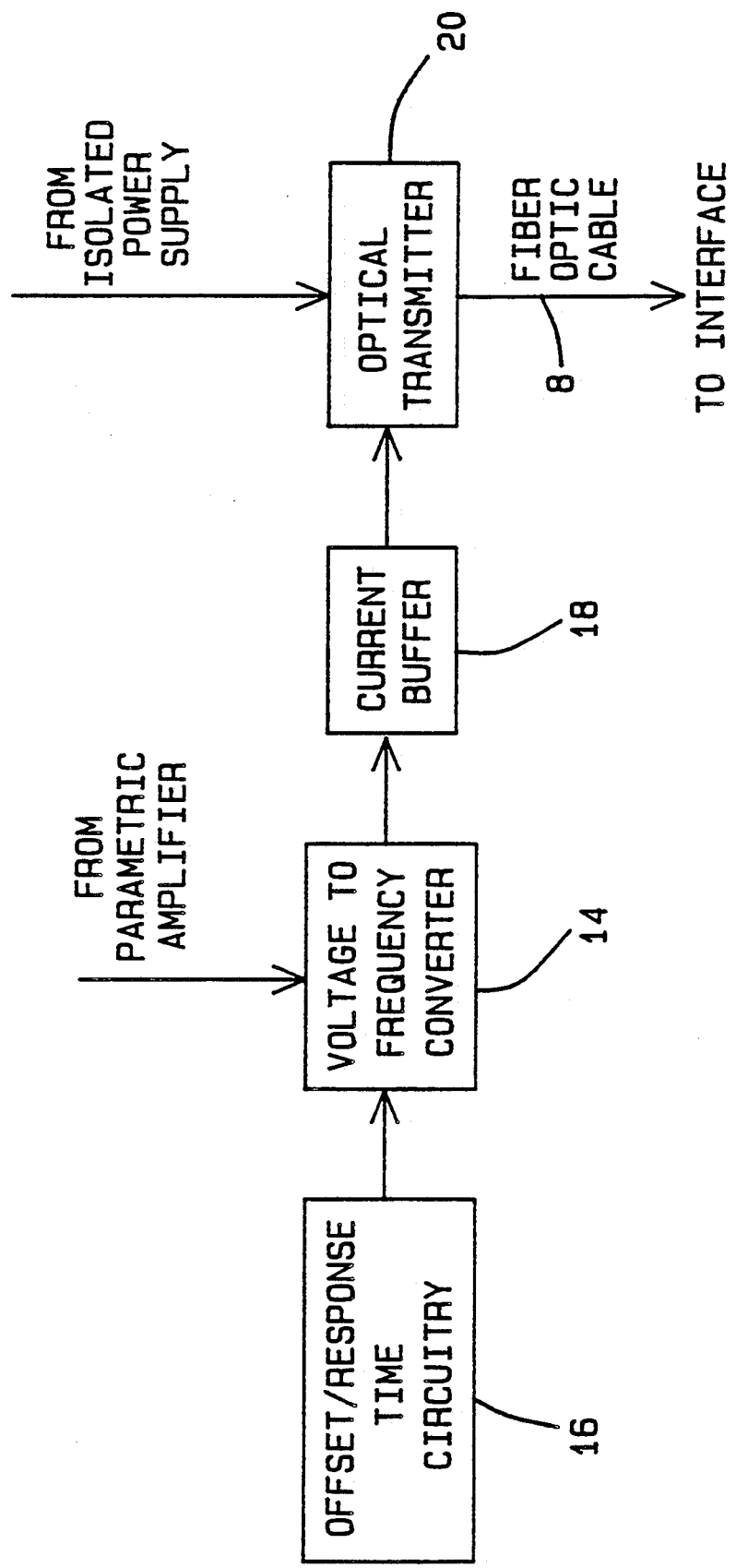
FIG. 2 is a flow chart showing the components which comprise the present invention.

FIG. 2 is a flow diagram showing the individual components of DOCM 5. The VFC (voltage to frequency converter) 14 transforms the amplified analog signal from the electrometer amplifier to a train of pulses whose frequency is a direct linear function of the analog input. In the preferred embodiment, a wide dynamic range voltage-to-frequency converter is used to provide the required conversion. In most applications, an analog-to-digital converter (A/D) would be standard technology. To get the resolution required for the data acquisition system at the mass spectrometry laboratory, the use of an A/D would compromise dynamic range and sample speed making it possible to miss critical events. In the preferred embodiment, it was determined that all design criteria could be fulfilled by using a 1 MHz, voltage-to-frequency converter. In the preferred embodiment, the voltage-to-frequency converter, VFC 14, is designed to produce a full scale frequency output of 1 MHz with 9.9 v ±0.05 Vdc.

VFC 14 has to operate with rapidly changing input signals. To accurately handle these dynamic signals, the output of the VFC 14 must be able to change much faster than the input. This is accomplished by offset/response time circuitry 16 to which the VFC 14 is responsive which offsets the output of VFC 14. By offsetting the VFC 14 output closer to a midrange frequency, approximately 100 KHz, the required deviation is decreased and responsive time is improved. In addition, the VFC 14 is biased to operate in a linear region and thus avoids any nonlinearities associated with operating near zero or full scale. This response time adjustment is accomplished by offsetting the current amplified stage of the VFC 14 with an adjustable reference current. Based upon this application of the voltage-to-frequency converter, a dynamic range equivalent to 20 bits, with a theoretical response time of 10 microseconds is obtained. Under computer control, near real-time data can be collected from the electrometer.

The output pulse of VFC 14 is TTL level compatible. The output of the VFC 14 goes through a current buffer 18 to eliminate any loading effects on the VFC's multi-vibrator.

An optical transmitter 20 is used to convert the digital signal from the VFC 14 into a modulated optical signal. An isolated power supply 7 is provided for optical transmitter 20 which is separate from the power supply for VFC 14 to insure that noise is not transmitted through common power lines. The source of the optical signal generated by optical transmitter 20 is an infrared wavelength light emitting diode (LED). The modulated infrared light is conducted between the transmitter 20 and computer interface 10 by a glass fiber waveguide 8. The use of fiber optics provides the following improvements over previously used coaxial cable links:

First, the optical fiber is immune to most interference. Unlike wire, glass fiber will not pick up or generate electromagnetic interference which is found in the mass spectrometry laboratory. False background noise due to electromagnetic coupling or grounds loops is eliminated.

Secondly, the optical link introduces minimal signal distortion. As stated earlier, the higher the frequency of transmission the greater the possibility of distortion. Unlike that of wire, the attenuation of a fiber optic is not frequency dependent. Therefore, with the DOCM 5 transmission rates up to 1 MHz are possible without appreciable ringing or distortion of the signal. This eliminates false triggering of the data counter.

Thirdly, fiber optic cable will not conduct electricity. This is a great safety feature particularly when data lines parallel cables with electrical potentials of several thousand volts. The use of optical linking also prevents the conduction of high voltage arcs into the data acquisition system.

At the interface 10, an optical receiver 22 converts the optical signal back to an electrical signal which mirrors the data contained in the original signal. A bit counter 24 converts the frequency based signal into n-bit digital words which are readable by the computer system. No noise or signal ringing, typical of wired cables, is introduced into the system. The electrometer 1 and computer interface 10 are electrically isolated from each other thus reducing ground loop noise.

The present invention provides improved capabilities for experiments in a mass spectrometry laboratory. It addresses a problem for which there was no equipment available designed to solve. It addressed this need in two ways. First it modified the NBS parametric electrometer for computerized data acquisition. This was done by using a voltage to frequency converter and supporting driver circuitry to digitize the analog output of the electrometer, resulting in up to 20 bits of resolution. Secondly, it used an integrated isolation system to link the electrometer output to the computer interface. This ensures the integrity of high resolution, low level data, even when exposed to the interference potentials present in the mass spectrometer environment. The optical link provides total immunity from the electromagnetic interferences generated by the high magnetic fields and voltages used for ionizing, accelerating and focusing ions.

The embodiments of this invention in which an exclusive property or privilege is claimed are defined as follows:

1. An apparatus for providing high resolution linkage of an analog output device to a digital computer system comprised of:
    a voltage-to-frequency converter coupled to the analog output device, said voltage-to-frequency converter capable of producing a train of pulse signals whose frequency is directly related to the analog output of the analog output device, response time circuitry means connected to said voltage-to-frequency converter to offset the output of said voltage-to-frequency converter to a midrange frequency, means for eliminating the loading effects on said output of the voltage-to-frequency converter where said eliminating means is coupled to said voltage-to-frequency converter.
    an optical transmitter means connected to said eliminating means where said optical transmitter means is capable of converting the signal from said voltage-to-frequency converter to an optical signal,
    means for sending said optical signal to an optical interface where said optical interface is capable of converting said optical signal to an electrical signal compatible with the digital computer system, and
    means for sending said electrical signal to the digital computer system.

2. The apparatus of claim 1 in which said analog output device is a parametric electrometer.

3. The apparatus of claim 2 in which said parametric electrometer is used in conjunction with a mass spectrometer.

4. The apparatus of claim 3 in which the optical interface comprises:
    an optical receiver coupled to said optical transmitter, and
    a bit counter coupled to said optical receiver, said bit counter capable of converting the signal from the optical receiver to an n-bit word compatible with the digital computer system.

5. The apparatus of claim 4 where said elimination means comprises a driver isolation circuit responsive to said voltage-to-frequency converter.

6. The apparatus of claim 5 in which said driver isolation circuitry includes a current buffer.

7. The apparatus of claim 6 in which said optical transmitter means includes an infrared wavelength light emitting diode capable of use as the source of the optical signal sent to said optical interface.

8. The apparatus of claim 7 in which said optical transmitter and said optical interface are connected by a fiber optic cable.

9. The apparatus of claim 8 in which the response time circuitry means offsets the output from said voltage-to-frequency converter to approximately 100 KHz.

10. A method for sending the output of an analog parametric electrometer having an electrical output signal to a digital computer system comprising the steps of:
    converting the output from the electrometer to a frequency-based electrical data signal,
    acting on the frequency-based electrical data signal to eliminate any loading effects,
    converting the frequency-based electrical data signal to an optical signal,
    transmitting the optical signal to an optical conversion interface,
    converting the optical signal to an electrical signal in the optical conversion interface, transmitting the electrical signal to the computer system whereby the data output of the electrometer can be stored in the computer system.

11. The method of claim 10 including the step of offsetting the frequency-based electrical data signal to midrange frequency.

12. The method of claim 11 in which the midrange frequency is approximately 100 KHz.

13. The method of claim 12 wherein the transmitting of the optical signal to an optical conversion interface is performed via optical fiber cable.

14. The method of sending the electrical output signal of an analog parametric electometer to a digital computer system comprising:
  converting the output signal from the electrometer to a frequency based electrical signal,
  offsetting the frequency-based electrical signal to a midrange frequency of approximately 100 KHz,
  acting on the frequency-based electrical signal to eliminate any loading effects,
  converting the frequency-based electrical signal to an optical signal,
  transmitting the optical signal to an optical conversion interface by means of a fiber optical cable,
  converting the optical signal to an electrical signal in the optical conversion interface,
  converting the electrical signal from the optical conversion interface to an n-bit data word before transmitting said signal to said computer system,
  transmitting the electrical signal to the computer system whereby the data output of the electrometer can be stored in the computer system.

* * * * *